Aug. 29, 1972   P. E. APPLEBY ET AL   3,687,756
METHOD AND APPARATUS FOR STRIPPING FLEXIBLE ARTICLE
FROM A BUILDING DRUM
Filed July 6, 1970   5 Sheets-Sheet 1

INVENTORS
PAUL E. APPLEBY
DENVER C. FOLDEN
PAUL R. STUHLDREHER

R. Washburn
AGENT

INVENTORS
PAUL E. APPLEBY
DENVER C. FOLDEN
PAUL R. STUHLDREHER

INVENTORS
PAUL E. APPLEBY
DENVER C. FOLDEN
PAUL R. STUHLDREHER

AGENT

INVENTORS
PAUL E. APPLEBY
DENVER C. FOLDEN
PAUL R. STUHLDREHER

AGENT

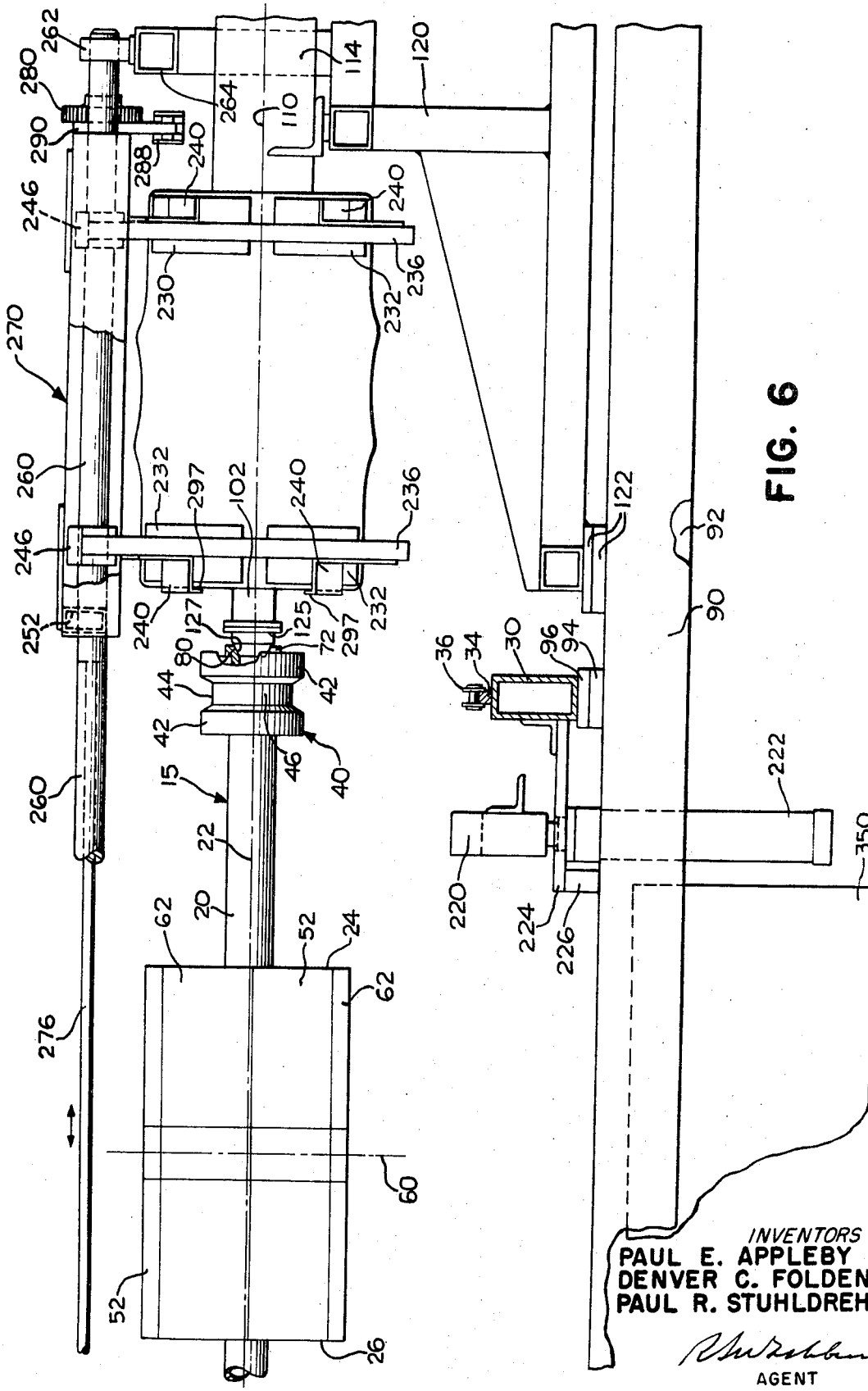

United States Patent Office 3,687,756
Patented Aug. 29, 1972

3,687,756
METHOD AND APPARATUS FOR STRIPPING FLEXIBLE ARTICLE FROM A BUILDING DRUM
Paul E. Appleby, Cuyahoga Falls, and Denver C. Folden and Paul R. Stuhldreher, Akron, Ohio, assignors to The Goodyear Tire & Rubber Company, Akron, Ohio
Filed July 6, 1970, Ser. No. 52,229
Int. Cl. B29h 17/14
U.S. Cl. 156—111
19 Claims

ABSTRACT OF THE DISCLOSURE

Apparatus for mechanically removing a tire or similar annular and flexible article from the drum on which it is built provides a lifting device for moving the tire and drum from a conveyor into cooperating alignment with clasp arms which embrace the tire and drum without distortion thereof and with opposing coaxial spindles which hold the drum. A driving clutch within one of the spindles extends to engage and operate a drum collapsing mechanism within the center shaft of the drum. A carriage on which the clasp arms are mounted moves parallel to the drum axis to carry the tire coaxially off the collapsed drum and over a cantilevered length of one of the spindles. The driving clutch operates in a reversed sense to reexpand the bare drum. The lifting device again moves to receive the drum, and the spindles are retracted, allowing the drum to be returned to the conveyor on which the drum is transported through a plurality of tire component applying stations. In its method aspect the disclosure includes removal of the tire, or like article, from the drum by purely axial movement, free of distortion or movement radially of the drum axis.

---

The foregoing abstract is not to be taken as limiting the invention of this application, and in order to understand the full nature and extent of the technical disclosure of this application, reference must be made to the accompanying drawings and the following detailed description.

The present invention relates to apparatus for the manufacture of tires and like endles elastomeric laminated articles. More particularly it relates to an apparatus for removing a tire carcass or an elastomeric laminated article from the building drum upon which the article is assembled.

A principal object of the invention is the provision of a method and apparatus effective to remove an uncured elastomeric article such as a tire, from the building drum upon which the article is built or assembled, without distortion and without manual effort.

Other objects and advantages will become apparent or be particularly pointed out in the following description of a particular embodiment of the invention and in the annexed drawings in which.

Figure 3:
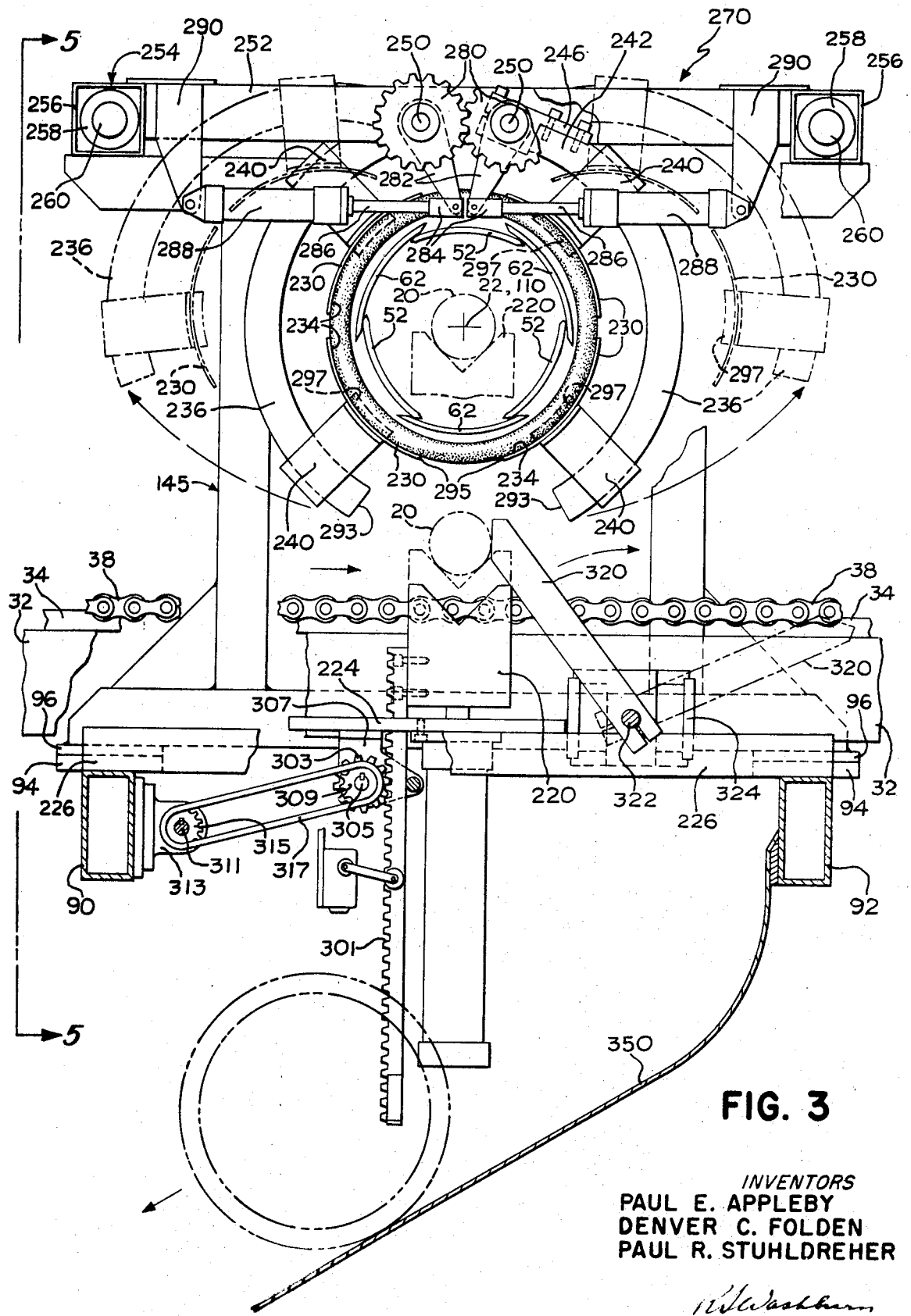
FIG. 3 is an elevation view, in section, taken as indicated by the line 3—3 of FIG. 1.
Figure 5:
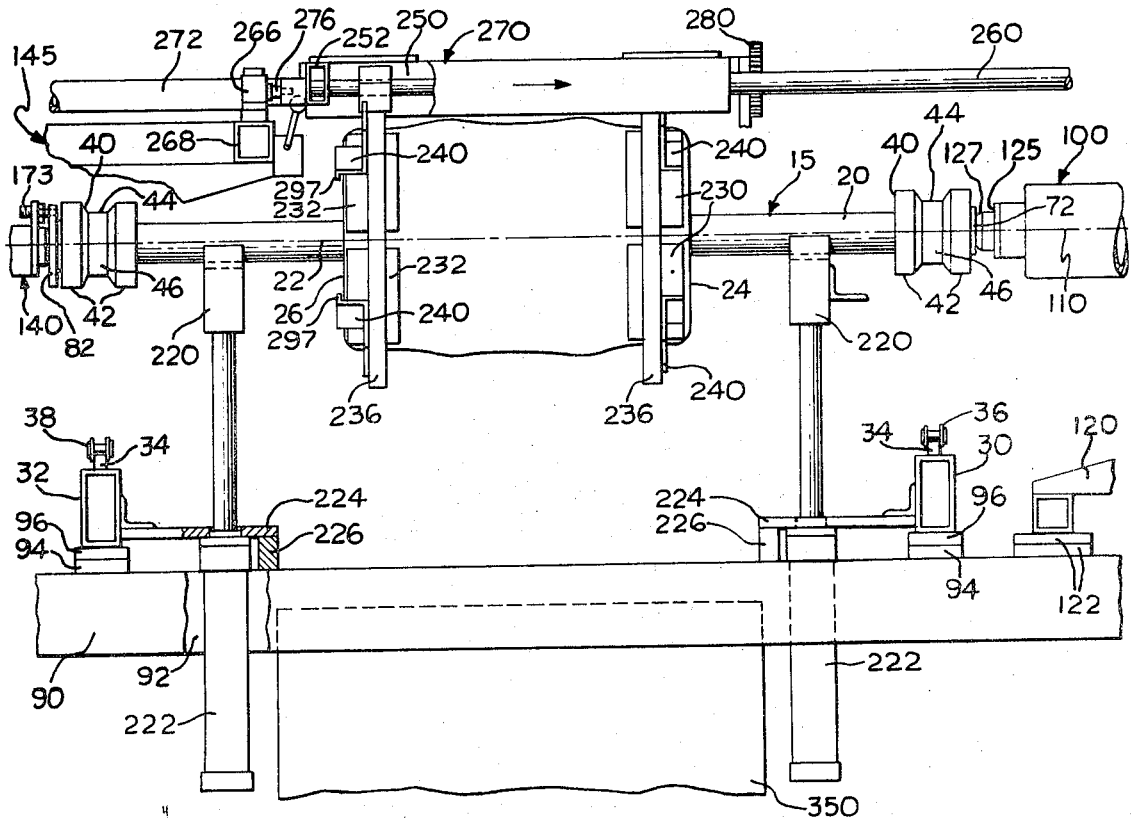

FIGS. 5, 6 (on sheet 5), and 7 (on sheet 4) are elevation views, showing positions in respective stages of operation of the apparatus, and oriented as indicated by the line 5—5 in FIG. 3.

Figure 1:
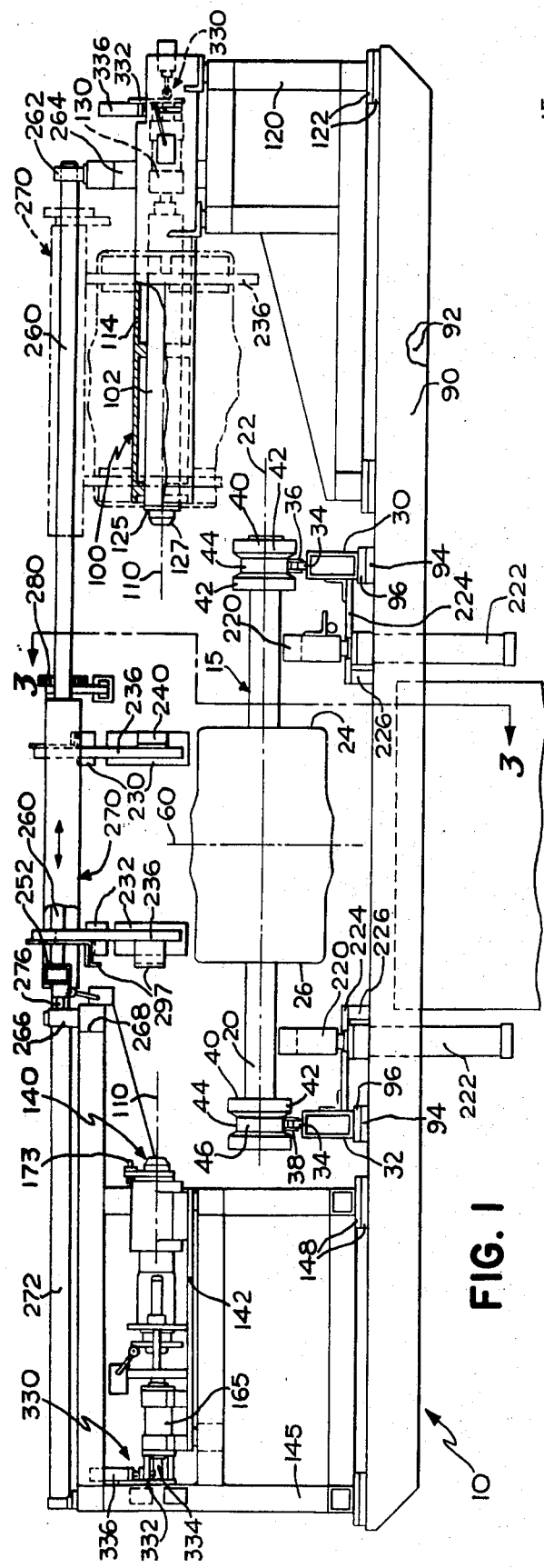
FIG. 1 is a view in elevation of apparatus in accordance with the invention.

Referring to the drawings and particularly to FIG. 1 thereof; the tire removal apparatus 10, illustrative of the invention, has particular utility in combination with an apparatus, for building tires, having a succesive plurality of ply applying stations and a plurality of tire building drums movable successively from station to station therein. The tire building apparatus employs a plurality of drums 15 each of which includes a center shaft 20 extending coaxially through and outwardly of the drum. The drums are moved through the building apparatus in a direction perpendicular to the horizontally oriented rotational axes 22 of the drum. The drums 15 are supported by structures disposed axially outwardly from the respective ends 24, 26 of the drums, which structures include the longitudinally extending side beams 30, 32. A continuously extending rail 34 mounted on each side beam supports one of a pair of parallel equal endless loops 36, 38 of conventional roller chain. The chains provide means for conveying the drums from station to station in the tire building apparatus, and are employed in cooperation with the tire removal apparatus 10 to move the tire building drum 15 into operative association therewith.

Figure 2:
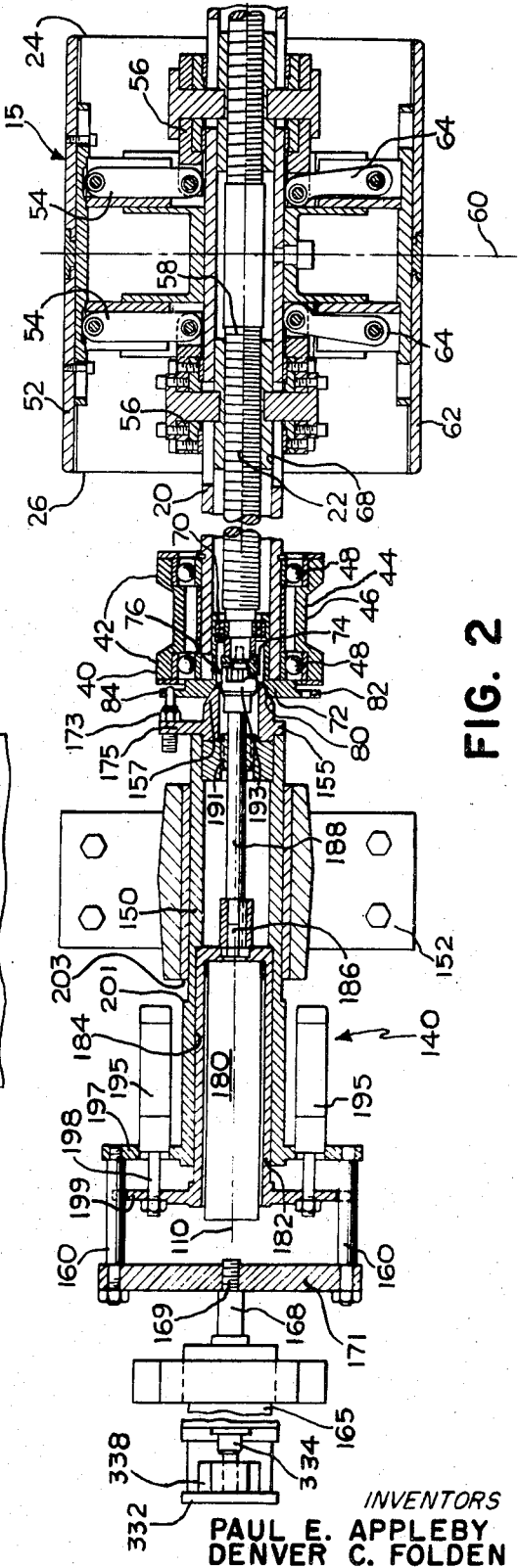
FIG. 2 is an enlarged sectional view of a portion of the apparatus of FIG. 1.

Referring to FIGS. 1 and 2; a bearing housing 40 is rotatably mounted at each end of each of the center shafts 20. Each housing has a pair of circumferential flanges 42 with an annular groove 44 of trapezoidal cross-section therebetween. The cylindrical surface 46 in the groove rests upon the chain in a depression between adjacent rollers which is formed by the hour-glass shape of the side links of the chain so that the drum can travel therewith. A pair of suitable anti-friction bearings 48 seated on the shaft and within the bearing housing accommodate relative rotation between the housing 40 and the shaft 20. The length of the shaft and the axial spacing between the grooves 44 of the respective identical bearing housings 40 mounted in like manner at each end of the shafts 20 is effectively equal to the distance between the respective roller chains 36 and 38.

Each drum has a plurality of sets of arcuate segments and means for shifting the segments radially outwardly to a first position in which the segments cooperate to provide a continuous circumferential building surface of cylindrical form, and inwardly to a second position wherein the segments lie entirely within a cylindrical space of lesser diameter than the least diameter of the tire or article assembled on the drum. The segments are arranged to be collapsed or retracted radially so as to enable the expeditious removal of a tire therefrom. The segment 52, typical of the first set of segments, is connected by the links 54 to a generally similar pair of operating blocks 56 which are moved axially in response to the rotation of the drive screw 58. Outward movement of the blocks 56 away from the mid-circumferential plane 60 of the drum, moves the segment 52 radially inwardly toward the axis 22. Movement of the blocks axially toward the mid-circumferential plane of the drum operates to move the segment 52 radially outwardly. The segment 62, typical of the second set of segments, is moved in like manner by the links 64 connecting the segment 62 to the blocks 56. The links 64 are slightly shorter than the aforementioned links 54 and while the drum 15 is fully expanded are oriented at a slightly different angular position with the result that the segments 62 of the second set are moved to overlie the segments 52 of the first set when the drum is in its collapsed position.

The operating screw 58 extends coaxially through the bore 68 of the shaft 20 and is supported therein by a bearing 70 carried in a bearing cup 72 secured corotatably to the shaft, by cap screws or the like, one within each end of the bore. One half 74 of the jaw clutch 76 is corotatably secured to each end of the screw 58. A coaxial coned seat 80 is formed in the flanged end of the cup 72. A flange 82 carried by the cup 72 is provided with a multiplicity of arcuately spaced holes 84 therethrough parallel to the axis 22 at uniform radial distance therefrom.

Referring again to FIG. 1; the tire removing apparatus 10 according to the invention includes a frame comprising a spaced parallel pair of beams 90, 92 disposed transversely of and beneath the longitudinal side beams 30, 32 of the tire building apparatus. Each beam has a pair of bolting pads 94 welded or otherwise fixed thereon, each of which is paired to and secured to a corresponding bolting pad 96 welded to the longitudinal beams.

In order to support the drum in a position spaced away from the previously mentioned structures to enable the tire on the drum to be moved axially therefrom without interference, the apparatus includes two spindles of which the first spindle 100 has a cylindrical tube 102 mounted slidably along an axis 110 coincident with its own longitudinal axis in a support sleeve 114 which is rigidly fixed to extend as a cantilever a sufficient distance toward the drum 15 to provide space for the tire to be passed from the drum axially beyond the end of its shaft 20 and into a position surrounding the support sleeve 114. The cantilever portion of the sleeve 114 is at least equal in length to the axial length of the article or tire to be removed by the apparatus 10 from the drum 15. The sleeve is supported at a suitable elevation above the beam 30, spacing the spindle axis 110 from the chains 36, 38 and support structure to accommodate the maximum radius of the tire, by a sub-base 120 of welded structural elements which is secured to the beams 90 and 92 outwardly of the chain beam 30 by the bolting pads 122. A centering plug 125 having a coned surface 127 adapted to engage conjugately the coned seats 80 is affixed coaxially at the end of the tube 102.

To provide for extension and retraction of the spindle 100, a fluid powered cylinder operator 130 is fixedly mounted in the sleeve 114 with its stroke axis collinear with the axis 110.

Making reference again to FIGS. 1 and 2; the spindle 140 is disposed coaxially of the axis 110 of the first spindle 100 and opposite thereto. The spindle 140 is mounted upon a base 142 which forms a part of a subframe 145 of welded structural members which is carried by the beams 90 and 92 and secured thereto outwardly of the chain beam 32 by conventional bolting pads 148. The spindle 140 includes a tubular member 150 slidably and non-rotatably supported in a slide bearing housing 152 bolted to the base 142. A hollow centering plug 155 having a conical surface 157 engageable with the coned seats 80 is affixed in the proximate end of the spindle 140 while the distal end of the tubular member 150 has a yoke 160 rigidly affixed thereon.

In order to move the spindle 140 toward and away from the respectively associated drum, a fluid power cylinder operator 165 is fixed on the base 142 and provided with a piston rod 168 having a threaded end 169 screwed coaxially into the transverse central portion 171 of the yoke.

A spring-biased plunger pin 173 is fixed in a radially extended ear carrier by the flange 175 of the centering plug 155 so that the pin is engageable with one of the holes 84 in the flange 82 carried by the bearing cup 72 in the end of the drum shaft 20. The spring movement of the plunger allows the pin 173 to be depressed until the pin is in proper alignment with one of the holes 84. Entry of the pin 173 into one of the holes 84, prevents relative rotation between the shaft 20 and the spindle 140, for purposes which will become apparent shortly.

In order to effect movement of the segments 52 and 62 to collapse and to expand the drum 15, a conventional air motor 180, an Ingersoll-Rand Multivane motor, Model 1841Q, is mounted coaxially within a flanged cylindrical member 182 which is itself mounted slidably in a counterbore 184 in the tubular member 150. The output shaft 186 of the air motor 180 is coupled to an extension shaft 188 supported in the bearing 191 mounted in the tubular member 150 adjacent the centering plug 155. A second half 193 of the previously mentioned jaw coupling 76 is corotatably secured to the extension shaft. The coupling half 193 is brought into driving engagement with the coupling half 74 by movement of the cylindrical member 182, the motor 180, and the shaft 188, effected by the air cylinders 195 affixed to the flange 197 of the tubular member 150. The piston rods 198 extend and move in the cylinders 195 parallel to the spindle axis 110 and are secured to the flange 199 of the cylindrical member 182. While the two halves of the jaw coupling 76 are in driving engagement, the air motor 180 is operated in a first sense to cause retraction of the segments 52 and 62 to collapse the drum 15 and facilitate removal of the article or tire therefrom, and in the opposite sense to reexpand the drum 15, moving the segments 52 and 62 radially outwardly to form continuous cylindrical surface for the application thereonto of ply elements of a succeeding tire.

To limit the outward axial movement of the spindle 140 toward the drum, a shoulder 201 is formed in the outer cylindrical surface of the tubular member 150 to engage the abutment formed by the radial face 203 of the housing 152.

For moving the drum, with a tire carcass thereon, from its position as illustrated in FIG. 1 wherein the drum is supported by the structures of the tire building apparatus and particularly by the conveying chains 36 and 38, to a second position wherein its own rotational axis 22 is aligned with the common axis 110 of the spindles 100 and 140, a pair of V-blocks 220 are respectively engageable with the center shaft 20 in a portion thereof extending between the housings 40 and the respective axial ends 24, 26 of the drum 15. In the apparatus 10, the V-blocks 220 are elevated respectively by a pair of synchronized fluid power cylinders 222 each mounted upon a bridge member 224 one of which is secured to each of the adjacent chain beams 30 and 32 and each of which is fastened at its other end to a cross member 226 supported by the beams 90 and 92 and spanning the space therebetween.

Referring now to FIGS. 1 and 3; to move a tire or article axially off a drum 15 supported on and coaxially with the spindles 100 and 140, the tire is clasped by a plurality of pads 230, 232 each of which has an arcuate surface 234 conformed to the cylindrical exterior surface of the tire. The pads cooperate to hold the tire firmly and gently without any appreciable deformation of the tire and without any significant movement of the tire radially with respect to its own axis. Each pad 230, 232 is removably secured to one of a plurality of arcuate swing arms 236 by an extension bracket 240. Each arm is secured at one of its arcuate ends 242 to a fitting 246 which is rigidly clamped to one of a pair of parallel rotatable shafts 250 carried in suitable bearings (not shown) fixed to the cross members 252 of the carrier frame 254, the hollow side members 256 of which retain sliding bearings 258 mounted slidably on a parallel spaced apart pair of guide bars 260. The guide bars are each supported at one end by a mounting block 262 secured to a pedestal 264 forming a part of the subframe 120 and at its other end by a mounting block 266 secured to the extended top member 268 of the subframe 145. The carrier 270 including the clasp arms 236 and pads 230, 232 is moved along the guide bars 260 parallel to the common axis by a long stroke, fluid powered cylinder 272 fixed on the subframe 145 above the spindle 140. The piston rod 276 of the cylinder 272 extends parallel to the shafts 250 about midway therebetween and is fixed to the cross member 252 of the carrier frame 254.

A meshing pair of identical gears 280 are mounted corotatably on the rotatable shafts 250 to synchronize the rotational movements thereof and to insure equal and opposite angular movements of the arcuate arms 236 carrying the clasp pads 230 and 232. One pair of arms 236 are mounted, one on each of the parallel shafts 250, to dispose the respective clasp pads 230 carried thereby to embrace the tire near one axial end 24 of the drum 15; the other pair of arcuate arms 236 are similarly secured each to one of the rotatable shafts 250 to dispose the clasp pads 232 carried thereby to embrace the tire at the other axial end 26 of the drum. The shafts 250 and the arms 236 carried thereby are rotated by crank arms 282 secured on the respective shafts. Each crank arm 282 is pin-connected to the clevis 284 on the piston rod 286 of a fluid power cylinder 288, the head end of which is pin-connected to a bracket 290 fixed on the carrier frame 254. The free ends 293 of the clasp arms and the respectively associated arcuate ends 295 of the tire engaging surfaces 234 are disposed a sufficient distance apart when the clasp arms 236 are in their open position, illustrated in phantom line in FIG. 3, to permit the tire building drum 15 with a tire thereon to be elevated, as has been described, without interference, from its position where supported by the carrying chains 36 and 38 (seen in FIG. 1) to its position in coaxial alignment with the spindles 100 and 140 (seen in FIG. 3). The pads 232 carried by the arms adjacent the subframe 145, the pair shown on the left in FIG. 1, are provided with tabs 297 which extend radially inwardly of the tire circumference to be engageable with the axial end face of the tire and are terminated at a radius greater than the minimum radius of the tire. So located, the tabs 297 are behind the tire as the same is moved off the drum by the carrier 270.

The arcuate surfaces 234 of the clasp pads cooperate to embrace a major portion of the circumference of the tire in each of two axially spaced zones preferably located to the axial ends of the tire. For this reason each of the pads subtends an arc of some 70 degrees and has an axial width of approximately 4 inches thereby assuring that the pads will embrace the tire without causing any significant radial displacement of any portion of the tire relative to its own rotational axis during relative movements between the tire and the drum on which the tire is built. The brackets 240 and the pads 230, 232 are spaced arcuately about the tire at approximately equal angles such that respective pairs thereof are diametrally opposed. Fluid pressure supplied to the respective cylinders 288, particularly in the direction to close the clasp pads against the tire to be removed, should be sufficient only to insure positive engagement with the tire without any deformation thereof.

As may be seen in FIG. 3, the movements of the two V-blocks 220 are synchronized by means of a geared train connected between the respective V-blocks. A rack 301 is secured to each V-block 220 for conjoint movement therewith and extends parallel to the movement of the V-block. Each rack 301 is in mesh with a pinion 303 which is corotatably mounted on a stub shaft 305 rotatably carried in suitable bearings 307 attached to the bridge member 224. Each stub shaft 305 also carries a sprocket 309 coaxial with the respective pinion 303 and corotatable therewith. A cross shaft 311 extending transversely of the tire building machine parallel to the beams 90 and 92 is supported in conventional pillow blocks 313 fixed to the beam 90. A pair of sprockets 315 in respective coplanar alignment with the sprockets 309 are corotatably mounted on the cros shaft 311 and each is corotatably connected to the respective sprocket 309 by an endless loop 317 of roller chain or the like. The arrangement provides as will be apparent, that the V-blocks 220 will move in synchronism so that the rotational axis 22 of the drum and of the tire carried by the drum is maintained parallel to the spindle axis 110 during movement of the drum by the V-blocks.

In the tire building apparatus, the chains 36 and 38 by which the tire building drums are moved are in continuous motion. In the apparatus 10 the chains 36 and 38 provide means for moving the tire building drum 15 in a first direction, horizontally, into operative association with the V-blocks 220. To arrest the horizontal movement of the drum 15 in a position to be engaged by the V-blocks, stop means comprising a pair of arms 320 mounted on a cross shaft 322 are rotated by an air motor 324 between a clearance position (shown in phantom lines) and a position to stop the horizontal movement of the drum by engaging the shaft 20 as it reaches a position of coincidence with the path of movement of the V-blocks. The stop arms 320, respectively, engage portions of the shaft disposed outwardly of the axial ends of the drum. The shaft 322 is affixed at one end collinearly with and rotated through about 120 degrees by the output shaft of the conventional partial-rotation beam 32. The other end of the shaft 322 is carried in a pillow block (not shown) secured to the other beam 30. After the tire has been stripped from the drum, as will be described presently in more detail, the drum 15 is returned by the V-blocks 220 again to rest the respective bearing housings 40 on the conveying chains 36 and 38 for onward movement thereby, at which time the stop arms 320 are swung into their clearance position permitting the drum to be moved from the apparatus.

Figure 4A:
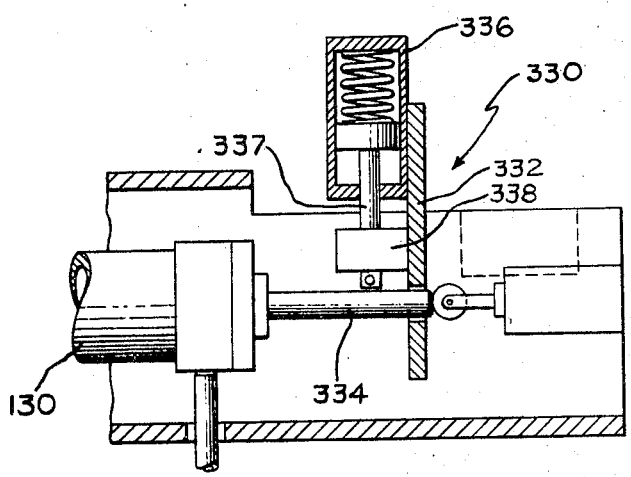
FIGS. 4a and 4b are sectional elevation views, enlarged, of alternative positions of portions of the apparatus of FIG. 1.
Figure 4B:
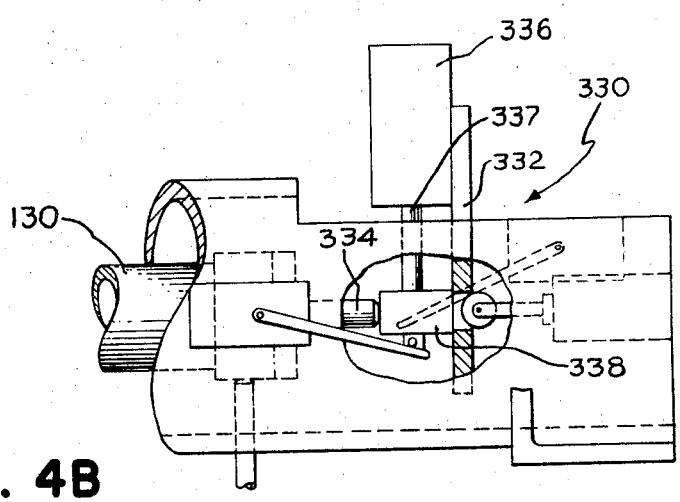

Referring to FIG. 1 and to FIGS. 4a and 4b; in order to provide safety of operation in the event of a failure of supply air pressure to the fluid pressure cylinder operators 130 and/or 165 a safety mechanism 330 cooperates with the abutment plates 332 which are rigidly secured respectively to the subframes. Each of the operating cylinders 130 and 165 is provided with a piston rod 334 extending axially outward of each of the cylinders toward the respectively associated abutment plate 332. A spring-extended, fluid-pressure retracted actuator 336 is affixed to each of the abutment plates with its stroke axis 337 perpendicular to the axis 110 of the spindles 100 and 140. A safety block 338 is moved by each actuator 336 slidingly along the surface of each of the abutment plates 332 between a safety position (FIG. 4b in which the safety block 338 is interposed between the outward end of each rod 334 and the respective abutment plate 332 so as to prevent axially outward movement of the respective piston rods 334, and a retracted position (FIG. 4a). When the spindles 100 and 140 are properly to be retracted, the V-blocks 220 being elevated to engage the shaft 20 and support the drum 15, air is admitted to the actuators 336 to move the safety blocks 338 out of alignment with the movements of the piston rods 334 so as to permit the spindles to be moved outwardly to release the drum while it is supported by the V-blocks. The spring action of the actuators 336 insures that the spindles 100 and/or 140 cannot be accidentally or inadvertently retracted.

Referring again to FIGS. 1 and 3; the apparatus 10 includes means receiving the tire as the same is released from the carrier 270 by swinging open the clasp arms 236. Means for receiving and for moving the tire from the apparatus to subsequent operations is provided in the apparatus 10 in the form of a conveyor slide 350 on which the tire is deposited by release of the tire from the carrier 270. The slide 350 or the equivalent, as will be apparent, will serve to transfer the tire to further processing not within the scope of the present invention. As will presently be set forth in greater detail the tire is released from the carrier and deposited on the slide between the structures which support the tire drum in its travel into and away from the apparatus 10.

The invention further contemplates an advantageous method for removing a tire carcass or endless laminated article from a building drum upon which the tire or article is constructed and without deformation of the article. The method comprises embracing the tire or tire carcass in two axially spaced zones thereon each of which is preferably adjacent to an axial end of the tire or carcass and in surface contact around the greater portion of the circumference of the tire by surfaces which engage the tire at diametrally opposite areas of the said zones to hold the carcass without any significant radial deformation or movement of the tire relative to its own rotational axis.

While holding the tire carcass, the tire building drum is collapsed by moving each of the segments forming the building surface thereof radially inwardly away from contact with the interior surface of the tire. After the building drum is collapsed, relative movement axially between the drum and the tire carcass is provided by moving the carcass axially of itself and of the drum to a position spaced axially off from the drum a distance sufficient to permit the drum to be moved in a direction radially of its own axis a distance sufficient adequately to clear the maximum radius of the tire or carcass, whereupon the same is moved back to a position approximately identical to the position which it occupied while carried by the expanded drum. It is then deposited upon a conveyor slide or equivalent to be carried away to further operations.

The operation of the apparatus 10 through a complete cycle of events therein begins with movement of a tire building drum 15 with a tire or carcass thereon by the chains 36 and 38 into engagement with the stop arms 320. When the drum is positioned as indicated in FIG. 3, the V-blocks 220 are moved upwardly carrying the drum and the tire or carcass thereon to the position illustrated in FIG. 5. When the building drum 15 is coaxially aligned with the spindles 100 and 140, these are extended to engage the plug centers 125 and 155 in the coned seats 80 in the respective ends of the center shaft 20. At the same time the driving pin 173 enters one of the holes 84 in the flange 82 and the safety blocks 338 are moved into locking position as has been described to prevent premature or accidental removal of the spindles from their supporting engagement with the drum. At the same time the clasp arms 236 and pads 230, 232 are closed to embrace the tire or carcass and the jaw coupling half 193 within the plug center 155 is moved to engage the jaw coupling half 74 carried by the drum screw 58. The motor 180 is energized causing the screw to move the blocks 56 axially outwardly so that the segments 52 and 62 of the drum are retracted, radially toward the drum axis 22, moving the surfaces thereof radially inward out of contact with the interior surface of the tire carcass to a position inwardly of a cylindrical surface defined by the least radius of the tire carcass. During the movement of the arms 236 and the collapsing of the drum 15, the V-blocks 220 are lowered to their lowermost position.

Figure 7:
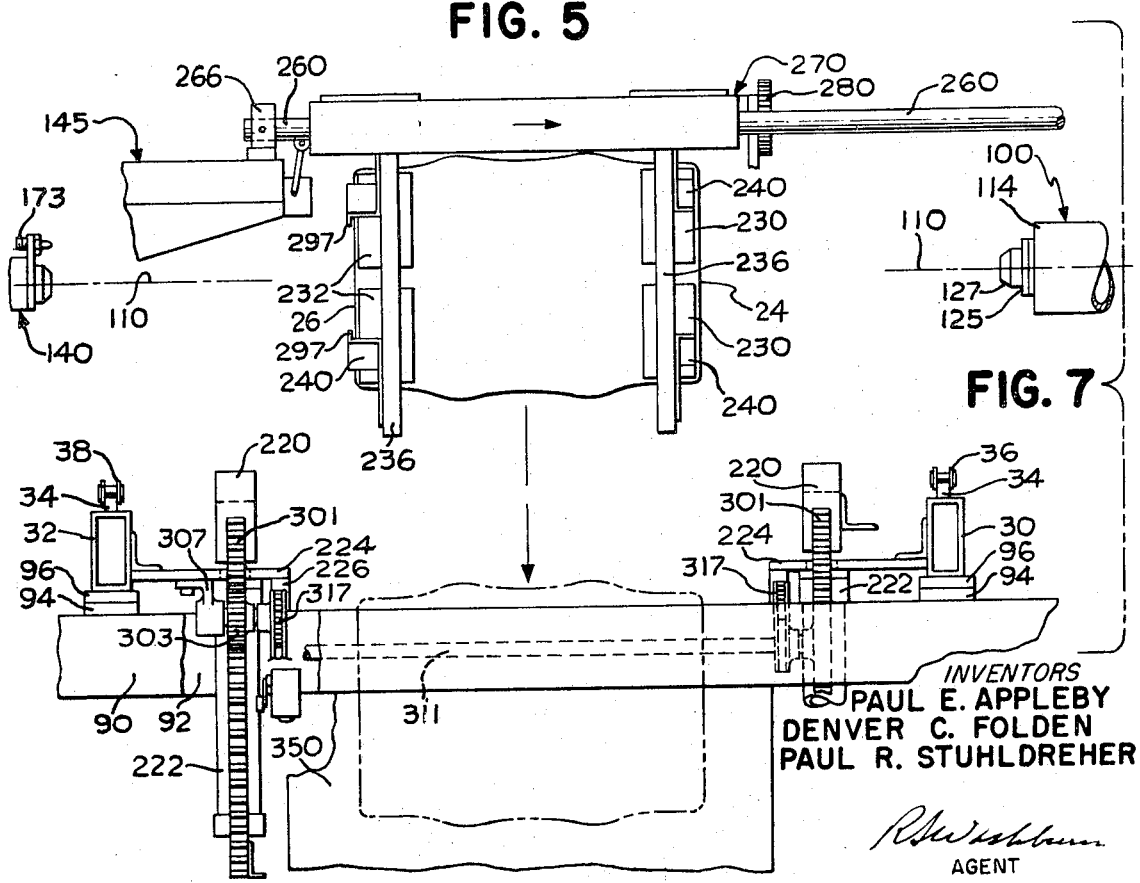

After the drum 15 has been collapsed and the V-blocks 220 moved downwardly, the carrier 270 is moved by the rod 276 of its operating cylinder 272 axially of the drum 15 to a position as shown in FIG. 6 in which the tire carcass surrounds the sleeve 114 of the spindle 100 and is axially spaced from the extreme end of the center shaft 20 of the drum 15. When the carrier 270 has reached the position shown in FIG. 6 the V-blocks 220 are again elevated during which movement the motor 180 drives the drum screw 58 in a reversed sense to move the blocks 56 axially toward one another to reexpand the drum 15 moving the segments 52 and 62 radially outwardly to form a generally continuous circumferential building surface, whereupon the motor 180 and the half coupling 193 are retracted, disengaging the latter from its opposite half 74, by the cylinders. With the V-blocks 220 in supporting engagement with the center shaft 220, the safety blocks 338 are retracted as has been described and the spindles 100 and 140 are retracted, moving the plug centers 125 and 155 out of their respective engagements with the coned 80 of the center shaft 20, whereupon the V-blocks 220 and the tire building drum 15, stripped of the tire carcass, are moved downwardly to place the drum housings 40 again on the carrying surface of the conveying chains 36 and 38. At this moment the stop arms 320 are moved downwardly by the air motor 324 and the drum 15 is moved away, horizontally, to further use. The carrier is then moved back to the position illustrated in FIG. 7 and the arms 236 are again swung open to deposit the tire carcass onto the surface of the slide 350 and the apparatus 10 is ready to repeat the described cycle.

As will now be apparent to persons skilled in the art, the cycles of operation of each of the described elements of the apparatus 10 can be controlled in conventional ways, using conventional devices, such as limit switches and control circuitry which may be either electric or pneumatic, none of which is within the scope of the present invention, to insure that the several steps of the cycle of operations occur in the sequence as has been described and in an expeditious manner.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for removing an endless flexible annular article such as a tire carcass from the building drum on which said article is built, said apparatus comprising conveying means for conveying said drum in a first direction, moving means engageable with center shaft means extending coaxially of said drum for moving said drum in a second direction from said conveying means to a position wherein the rotational axis of said drum is spaced away from the first said means by a distance at least equal to the maximum radius of said article, support means mounted for cooperative association with said moving means and operable to support said drum in said position wherein said articles is free of interference for movement thereof axially off said drum a distance at least equal to the length of said drum and to release said drum for movement away from said position, said moving means for moving said drum then being operable to move said drum from said position to operative association with the conveying means.

2. Apparatus as claimed in claim 1, including stop means operable to stop movement of said drum in said first direction during continuing movement of said conveying means at a location whereat said moving means is operable to engage said shaft means, and means selectively operable to move said stop means into and out of drum stopping position.

3. Apparatus as claimed in claim 1, further comprising carrier means mounted for movement parallel to said axis in the said position thereof including clasp means for clasping said article while the same is on said drum in said position, and driving means for moving said carrier means to effect removal of said article axially off from said drum a distance at least equal to the axial length thereof.

4. Apparatus as claimed in claim 3, including guide means mounting said carrier means for movement thereof parallel to the axis of said drum between a position wherein said clasp means are disposed to engage an article carried upon said drum and a position wherein said clasp means and said article embraced thereby are disposed axially beyond the respectively associated end of said center shaft means.

5. Apparatus as claimed in claim 4, including push tabs fixed on at least two of said clasp means, said push tabs being engageable with an axial end surface radially outward of at least inner radius of said article and behind said article as the same is moved axially off said drum.

6. Apparatus as claimed in claim 1, said drum including surface, retracting means for effecting radially inward movement of said segments, said moving means effective to support said drum including clutch means connectable with the retracting means while said drum is in said position and operable to drive said retracting means to collapse and to reexpand said drum.

7. Apparatus as claimed in claim 6, further comprising carrier means mounted for movement parallel to said axis and including clasp means for clasping said article while the drum is disposed in said position, and driving means connected to said carrier means and operative to move the same to carry said article axially off said drum beyond the respectively associated axial end thereof.

8. Apparatus as claimed in claim 7, said carrier means comprising a frame, a pair of synchronously coupled parallel shafts mounted rotatably in said frame, said clasp means having a plurality of arcuate arms fixed on said shafts for swinging movement in planes normal to said axis and respectively oppositely about said shafts, said arms being provided with a plurality of pads having arcuate surfaces conforming to arcuate exterior surfaces of the article to clasp the same without deformation or significant radial movement thereof with respect to its own axis of rotation, and means operable to rotate said shafts.

9. Apparatus as claimed in claim 1, said moving means for moving said drum comprising a pair of fluid power cylinders, V-block means connected to each said cylinder for engaging respectively a portion of said center shaft means between the drum mounted thereon and the respective end of said shaft means.

10. Apparatus as claimed in claim 9, including synchronizing means connected between said cylinders for synchronizing movement of said V-block means for engaging the center shaft whereby the rotational axis of said shaft is moved through successive parallel positions.

11. Apparatus as claimed in claim 10, said synchronizing means comprising a rack connected to each said V-block means for movement therewith and extending parallel to said movement, a cross shaft rotatably mounted on and extending between structures supporting said drum and shaft means at opposite ends thereof, and gear means corotatably connecting said cross shaft with each of said racks.

12. Apparatus as claimed in claim 1, said support means comprising a pair of spindles mounted for coaxial movement toward and away from each other along a common axis each having centering means engageable with means disposed in said center shaft means at each end thereof, at least one of said spindles having a cantilevered support sleeve at least equal in length to the axial length of said article over and around which the article can be moved axially without interference.

13. Apparatus as claimed in claim 12, including clutch means mounted in one of said spindles and engageable with retracting means in said center shaft means operable to collapse and to reexpand said drum while the same is supported by said spindles.

14. Apparatus as claimed in claim 12, including holding means carried by one of said spindles and engageable with means carried by said shaft means to prevent rotation of the latter during collapse and reexpansion of said drum.

15. Apparatus as claimed in claim 12, comprising safety lock means selectively engageable and disengageable respectively with each said spindle positively to prevent axially outward movement of said spindles away from a drum supported thereby while said drum is otherwise unsupported.

16. In an apparatus for building tires having a plurality of tire building drums fixed coaxially upon extended central shafts and a plurality of stations wherein successive components of said tires are applied to said drums, and a pair of parallel laterally spaced apart structures including continuously moving endless conveying means for supporting and moving said shafts successively from one to another of said stations, the combination comprising a pair of spindles each having drum shaft engaging means thereon mounted for coaxial movement toward and away from each other along a common axis, said central shafts having coaxially mounted spindle engaging means fixed therein, clutch means carried in one of said spindles and engageable with retracting means carried in each of said shafts to effect collapse and reexpansion of the respective drums, a synchronously operable pair of fluid power cylinders each having a rod terminating in a shaft engaging block, each of said cylinders being mounted adjacent to one of said structures to extend and to retract each said block in directions perpendicular to said common axis to move successive ones of said drums between a position wherein a drum is supported by said structures and a second position wherein said drum is in coaxial alignment with said common axis, carrier means mounted for movement parallel to said common axis, at least one pair of synchronously movable clasp arms having a plurality of arcuate pads conforming to exterior arcuate surfaces of successive ones of said tires, clasp means including said arms operative to engage said pads with said successive ones of said tires, driving means for moving said carrier to remove a tire axially from a drum to a position axially beyond the end of the shaft thereof, said cylinders being operable to move said drum without the tire thereon to the first said position wherein the drum is again supported by said structures for movement by said conveying means.

17. A method for removing a tire carcass from the tire building drum upon which the carcass is built which method comprises moving the tire carcass and the drum therewithin to a predetermined fixed position, embracing the carcass adjacent the beads thereof at a plurality fixed of axial zones between members disposed circumferentially in diametrally opposed pairs about the tire in each of said zones to hold the tire carcass free of any significant deformation or displacement relative to its own rotational axis, and effecting relative axial movement between said carcass and said building drum sufficient to provide axial space between said carcass and said drum and releasing said carass from embrace by said members.

18. A method as claimed in claim 17, further comprising collapsing said building drum while the carcass is held by said members and free of radial movement with respect to the rotational axis of the tire.

19. A method as claimed in claim 18, further comprising holding said drum axially stationary while effecting said relative movement by moving said carcass axially of said drum to a position spaced axially therefrom, moving said drum in a direction radial to its own axis to a position radially spaced from said tire carcass, and moving said tire carcass axially again into the first said position, and depositing said tire upon a receiving surface.

References Cited
UNITED STATES PATENTS

| 2,407,152 | 9/1946 | Haase | 156—111 |
| 3,151,013 | 9/1964 | Nebout | 156—126 |
| 2,479,027 | 8/1949 | Sternad et al. | 156—396 |

STEPHEN C. BENTLEY, Primary Examiner

U.S. Cl. X.R.

156—396

UNITED STATES PATENT OFFICE
CERTIFICATE OF CORRECTION

Patent No. 3,687,756         Dated August 29, 1972

Inventor(s) Paul E Appleby, Denver C Folden, Paul R Stuhldreher

It is certified that error appears in the above-identified patent and that said Letters Patent are hereby corrected as shown below:

Col. 1, line 44, "endles" should read -- endless --.

Col. 3, line 26, "appartaus" should read -- apparatus --;
       line 61, "carrier" should read -- carried --.

Col. 5, line 62, "cros" should read -- cross --.

Col. 7, line 64, "coned 80" should read -- coned seats 80 --.

Claim 5, line 4, "at least" should read -- the least --.

Claim 6, line 1, after "including", -- a plurality of segments providing a continuous building --, has been omitted.

Claim 17, line 5, "plurality fixed of" should read -- plurality of fixed --.

Signed and sealed this 30th day of January 1973.

(SEAL)
Attest:

EDWARD M. FLETCHER, JR.
Attesting Officer

ROBERT GOTTSCHALK
Commissioner of Patents